(12) United States Patent
Gunnarsson et al.

(10) Patent No.: US 10,794,238 B2
(45) Date of Patent: Oct. 6, 2020

(54) METHOD FOR CHANGING GEAR RATIO IN A GEARBOX OF A VEHICLE

(71) Applicant: SCANIA CV AB, Södertälje (SE)

(72) Inventors: Niclas Gunnarsson, Huddinge (SE); Erik Höckerdal, Södertälje (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 16/315,134

(22) PCT Filed: Jun. 28, 2017

(86) PCT No.: PCT/SE2017/050714
§ 371 (c)(1),
(2) Date: Jan. 3, 2019

(87) PCT Pub. No.: WO2018/013037
PCT Pub. Date: Jan. 18, 2018

(65) Prior Publication Data
US 2019/0211717 A1    Jul. 11, 2019

(30) Foreign Application Priority Data

Jul. 11, 2016 (SE) ...................................... 1651031

(51) Int. Cl.
*F01L 1/344*    (2006.01)
*F01L 13/06*    (2006.01)
(Continued)

(52) U.S. Cl.
CPC ................. *F01L 1/344* (2013.01); *F01L 1/34* (2013.01); *F01L 13/06* (2013.01);
(Continued)

(58) Field of Classification Search
CPC ......... F01L 13/08; F01L 13/085; F01L 13/06; F01L 13/065; F02D 13/04
See application file for complete search history.

(56) References Cited

U.S. PATENT DOCUMENTS 3,234,923 A    2/1966  Fleck et al.
3,786,792 A *  1/1974  Pelizzoni .............. F01L 1/2422
                                                      123/321
(Continued)

FOREIGN PATENT DOCUMENTS

CN    1806108 A     7/2006
EP    0458857 A1    12/1991
(Continued)

OTHER PUBLICATIONS

Scania CV AB, International Application No. PCT/SE2017/050714, International Preliminary Report on Patentability, dated Jan. 15, 2019.
(Continued)

*Primary Examiner* — Patrick Hamo
*Assistant Examiner* — Wesley G Harris
(74) *Attorney, Agent, or Firm* — Moore & Van Allen PLLC; W. Kevin Ransom

(57) ABSTRACT

Provided is a method for changing gear ratio in a gearbox comprising: receiving a signal to change the gear ratio; calculating braking torque that the engine should provide to reduce the rotational speed of the engine to a target rotational speed; phase-shifting a second camshaft in relation to the crankshaft, to a state where the exhaust valve is controlled to be opened during the expansion stroke and closed during the exhaust stroke; disconnecting the engine from the driving wheel; opening and closing the exhaust valve with a decompression device in a transition area between an exhaust stroke and an inlet stroke and also between a compression stroke and an expansion stroke, when the piston is at a top dead center in the cylinder to achieve engine braking through compression in the cylinders during the exhaust stroke and the compression stroke, and f) shifting a gear in the gearbox.

20 Claims, 6 Drawing Sheets

(51) Int. Cl.

| | | |
|---|---|---|
| *F02D 13/04* | (2006.01) | |
| *F16H 63/50* | (2006.01) | |
| *F02D 13/02* | (2006.01) | |
| *F02D 41/02* | (2006.01) | |
| *F01L 1/34* | (2006.01) | |
| *F16H 61/21* | (2006.01) | |
| *F16H 59/14* | (2006.01) | |
| *F02D 41/00* | (2006.01) | |
| *F16H 61/12* | (2010.01) | |

(52) U.S. Cl.
CPC ......... *F02D 13/0219* (2013.01); *F02D 13/04* (2013.01); *F02D 41/022* (2013.01); *F02D 41/023* (2013.01); *F16H 61/21* (2013.01); *F16H 63/50* (2013.01); *F02D 2041/001* (2013.01); *F02D 2200/101* (2013.01); *F02D 2250/18* (2013.01); *F16H 61/12* (2013.01); *F16H 2059/147* (2013.01)

(56) References Cited

U.S. PATENT DOCUMENTS

| | | | |
|---|---|---|---|
| 5,409,432 A | 4/1995 | Steeby | |
| 5,910,069 A | 6/1999 | Markyvech | |
| 6,394,067 B1 | 5/2002 | Usko et al. | |
| 8,290,689 B2 * | 10/2012 | Andrasko | F02D 9/06 701/112 |
| 9,234,467 B2 * | 1/2016 | Ernest | F02D 13/04 |
| 2002/0014220 A1 * | 2/2002 | Berglund | F01L 13/06 123/321 |
| 2004/0087842 A1 | 5/2004 | Lakowicz et al. | |
| 2004/0187842 A1 | 9/2004 | Yang | |
| 2006/0199699 A1 | 9/2006 | Berglund et al. | |
| 2010/0180860 A1 | 7/2010 | Hergert et al. | |
| 2010/0286885 A1 | 11/2010 | Guggolz et al. | |
| 2017/0002702 A1 | 1/2017 | Gunnarsson et al. | |

FOREIGN PATENT DOCUMENTS

| | | |
|---|---|---|
| EP | 638455 A1 | 2/1995 |
| EP | 1343958 A1 | 9/2003 |
| WO | 9009514 A1 | 8/1990 |
| WO | 0037786 A1 | 6/2000 |
| WO | 02052129 A1 | 7/2002 |
| WO | 03026914 A1 | 4/2003 |
| WO | 2004059131 A2 | 7/2004 |
| WO | 2012038195 A1 | 3/2012 |
| WO | 2015084243 A2 | 6/2015 |

OTHER PUBLICATIONS

International Search Report for International Patent Application No. PCT/SE2017/050714 dated Sep. 27, 2017.

Written Opinion of the International Searching Authority for International Patent Application No. PCT/SE2017/050714 dated Sep. 27, 2017.

Office Action from Swedish Patent Office related to International Patent Application No. 1651031-5 dated Feb. 13, 2017.

Scania CV AB, European Application No. 17828061.6, Extended European Search Report, dated Feb. 11, 2020.

Scania CV AB, Chinese Application No. 201780041804.8, Second Office Action, dated Apr. 3, 2020.

Scania CV AB, Korean Application No. 10-2019-7002816, Office Action, dated Apr. 6, 2020.

* cited by examiner

METHOD FOR CHANGING GEAR RATIO IN A GEARBOX OF A VEHICLE

CROSS-REFERENCE TO RELATED APPLICATIONS

This application is a national stage application (filed under 35 § U.S.C. 371) of PCT/SE2017/050714, filed Jun. 28, 2017 of the same title, which, in turn, claims priority to Swedish Application No. 1651031-5 filed Jul. 11, 2016; the contents of each of which are hereby incorporated by reference.

FIELD OF THE INVENTION

The present invention relates to a method for changing gear ratio in a gearbox of a vehicle, a vehicle, a computer program and a computer program product according to the appended claims.

BACKGROUND OF THE INVENTION

In connection with engine braking of a vehicle, the throttle and fuel supply to the internal combustion engine are shut off. When the air in the cylinders is compressed during the compression stroke, the pistons will, via the rods, exert a braking torque on the crankshaft, which during the engine brake process is operated by the vehicle's driving wheels via driving shafts, a propeller shaft and the transmission. Since the crankshaft is directly connected with the vehicle's driving wheels during the engine braking process, the braking torque from pistons and rods, affecting the crankshaft, will therefore brake the vehicle during engine braking.

In order to reinforce the effect of the engine brake, the exhaust valves may be deactivated, so that they remain closed during the exhaust stroke. The air in the cylinders will thus be compressed also during the exhaust stroke, entailing that the braking torque from the pistons and rods, affecting the crankshaft, also arises during the exhaust stroke.

In order to utilize the braking energy in connection with engine braking, the pressure of the air compressed in the cylinders must be reduced at the end of each compression. This is carried out with a decompression device that controls the exhaust valves, so that they are opened at the end of the compression stroke and at the end of the expansion stroke. Therefore, the air compressed in the cylinders will leave the cylinder via the exhaust channels and further along through the exhaust system. The decompression device subsequently closes the exhaust valves, so that air may be sucked in through the inlet valves and an overpressure may be built up in the cylinders during the next compression.

In an internal combustion engine comprising several cylinders, it is possible to control the braking torque during engine braking, by controlling the deactivation of the exhaust valves and controlling the decompression device for each cylinder. For example, by deactivating the exhaust valves and activating the decompression device in half of the engine's cylinders, the braking torque will be halved. It is also possible to deactivate the exhaust valves in any number of the engine's cylinders. Control may thus be carried out in steps, wherein the number of controllable steps depends on the number of cylinders in the engine.

Instead of deactivating the exhaust valves the control of the engine braking torque can be carried out steplessly by phase-shifting the opening of the exhaust valves. The braking torque of the engine is controlled by phase shifting the camshaft, in order thus to control the compression on the cylinders during the exhaust stroke. A decompression device is connected to the exhaust valves, which decompression device is adapted to open and close the exhaust valves in the transition area between an exhaust stroke and an inlet stroke, and also between a compression stroke and an expansion stroke, when the piston is at top dead centre in the cylinder. By opening the exhaust valves in said transition areas the pressure in the cylinders is reduced when the inlet valves are opened. The size of the braking torque may thus be controlled steplessly during engine braking.

When shifting gears and changing the gear ratio in the gearbox of a vehicle the rotational speed of the internal combustion engine is changed. In order to achieve a quick and efficient gear shifting the rotational speed of the internal combustion engine should be changed as fast as possible to the rotational speed at which the internal combustion engine should be running at the new gear ratio.

When an upshift takes place in the gearbox the rotational speed of the internal combustion engine must be decreased. The rotational speed of the internal combustion engine may be decreased by phase-shifting the opening of the exhaust valves together with the decompression device for opening and closing the exhaust valves in the transition area between an exhaust stroke and an inlet stroke, and also between a compression stroke and an expansion stroke, when the piston is at top dead centre in the cylinder.

Document WO 2004059131 shows a system for engine braking in an internal combustion engine, wherein an exhaust valve is opened on several occasions during engine braking.

Document WO 2012038195 pertains to an engine braking system for an internal combustion engine, wherein the opening and closing of the exhaust valves is brought forward in time, following which an opening of the exhaust valves takes place after the closing, with the objective of increasing the engine brake effect.

Document U.S. Pat. No. 6,394,067 shows an internal combustion engine with double camshafts, wherein the opening of the exhaust valve is brought forward in time during engine braking. The exhaust valve is subsequently only partly closed, in order to be fully closed before it is opened to reduce the pressure in the cylinders.

Document U.S. Pat. No. 3,234,923 describes a method and an engine braking system for an internal combustion engine. A phase shift of a camshaft to control exhaust valves results in engine braking. The phase shift is approximately 160 degrees on the crankshaft, which entails that the exhaust valves are opened at a crankshaft position, corresponding to the exhaust valve opening achieved by the decompression device, as discussed above.

However, the known methods for engine braking are not fast enough for generating a high braking effect in order to reducing the rotational speed of the internal combustion engine, so that a quick and efficient gear shifting can be achieved.

SUMMARY OF THE INVENTION

Despite known solutions, there is still a need to further develop a method for changing gear ratio in a gearbox of a vehicle which is quick and efficient.

The objective of the present invention is thus to achieve a method for changing gear ratio in a gearbox of a vehicle which is quick and efficient.

Another object of the present invention is to achieve a new and advantageous computer program for changing gear ratio in a gearbox of a vehicle.

The herein mentioned objects and other objects are achieved by a method for changing gear ratio in a gearbox of a vehicle, a vehicle, a computer program and a computer program product according to the independent claims.

According to an aspect of the present invention a method for changing gear ratio in a gearbox of a vehicle is provided. The gearbox being arranged to transfer torque between a four stroke internal combustion engine and at least one driving wheel of said vehicle, said four stroke internal combustion engine comprising at least one cylinder, a piston arranged in each cylinder, at least one inlet valve arranged in each cylinder, which inlet valve is connected with an inlet system, at least one first camshaft which controls each inlet valve, at least one exhaust valve arranged in each cylinder, which exhaust valve is connected with an exhaust system, at least one second camshaft which controls each exhaust valve, and a crankshaft which controls each camshaft.

The method comprises the steps of:

a) receiving a first signal that the gear ratio should be changed;

b) calculating the braking torque that the internal combustion engine should provide in order to reduce the rotational speed of the internal combustion engine to a target rotational speed at which the internal combustion engine should be running after the gear ratio has been changed;

c) phase-shifting the at least one second camshaft in relation to the crankshaft, so that the at least one second camshaft is phase-shifted to a state, where the at least one exhaust valve is controlled in such a way, that it is opened during the expansion stroke of the internal combustion engine and closed during the exhaust stroke of the internal combustion engine, wherein the phase shifting of every second camshaft may be controlled, in order to control the compression during the exhaust stroke, for achieving stepless control of the size of the braking torque during engine braking, so that the size of the braking torque that the internal combustion engine should provide and is calculated in step b) is dependent on how many degrees every second camshaft is phase-shifted;

d) disconnecting the internal combustion engine from the at least one driving wheel;

e) opening and closing the at least one exhaust valve with a decompression device in the transition area between an exhaust stroke and an inlet stroke, and also between a compression stroke and an expansion stroke, when the piston is at a top dead centre in the cylinder in order to achieve engine braking through compression in the cylinders during the exhaust stroke and the compression stroke, and f) shifting gear in the gearbox.

This method for changing gear ratio in the gearbox of a vehicle is quick and efficient. In step a) the first signal is received, which indicates that the gear ratio should be changed. The gear shifting in the gearbox may be an upshift, which means that the rotational speed of the internal combustion engine should be lower after the gear shifting comparing to the rotational speed before the gear shifting. In order to shorten time for reducing the rotational speed of the internal combustion engine, the braking torque that the internal combustion engine should provide is calculated in step b) in order to reduce the rotational speed of the internal combustion engine to the target rotational speed at which the internal combustion engine should be running after the gear ratio has been changed.

In order to achieve a quick and efficient gear shifting, the generation of braking torque is prepared by means of phase-shifting the at least one second camshaft in relation to the crankshaft in step c), so that the at least one second camshaft is phase-shifted to a state, where the at least one exhaust valve is controlled in such a way, that it is opened during the expansion stroke of the internal combustion engine and closed during the exhaust stroke of the internal combustion engine. The phase-shifting of the at least one second camshaft will at this stage not lead to the generating of braking torque, but is only a preparation for the generating of braking torque. The stepless control of the size of the braking torque during engine braking is achieved by the calculation in step b). Thus, the braking torque is dependent on how many degrees every second camshaft 28 is phase-shifted. Such a phase-shifting device arranged for every second camshaft 28 will effectively control the size of the braking torque that the internal combustion engine 2 should provide. Thus, the phase-shifting of every second camshaft 28 will make it possible to control the braking torque.

When disconnecting the internal combustion engine from the at least one driving wheel in step d) the internal combustion engine in rotating independently from the at least one driving wheel. Thus, the rotational speed of the internal combustion engine may be changed. The disconnecting of the internal combustion engine from the at least one driving wheel may be performed by means of disengaging the clutch between the internal combustion engine and the gearbox and/or shifting the gearbox to a neutral gear.

Engine braking is achieved by opening and closing the at least one exhaust valve in step e) by means of a decompression device in the transition area between an exhaust stroke and an inlet stroke, and also between a compression stroke and an expansion stroke, when the piston is at a top dead centre in the cylinder. The engine braking is achieved through compression in the cylinders during the exhaust stroke and the compression stroke. The engine braking will generate a high braking effect in order to reduce the rotational speed of the internal combustion engine in a short period of time, so that a quick and efficient gear shifting can be achieved.

When the rotational speed of the internal combustion engine has been reduced to a target rotational speed at which the internal combustion engine should be running after the gear ratio has been changed, shifting gear in the gearbox is performed according to step f).

According to an aspect of the invention the step c) is performed substantially simultaneously as a further step g) reducing the torque provided by the internal combustion engine. Reducing the torque provided by the internal combustion engine is made by closing or reducing the fuel supply to the cylinders of the internal combustion engine. When steps c) and g) are performed substantially simultaneously the period of time for changing gear ratio in a gearbox is reduced.

According to an aspect of the invention, after step c) and before step d), the method comprises a further step g) reducing the torque provided by the internal combustion engine. Reducing the torque provided by the internal combustion engine is made by closing or reducing the fuel supply to the cylinders of the internal combustion engine. When torque is reduced after the phase-shifting of the at least one second camshaft in step c) the period of time for changing gear ratio in a gearbox is even more reduced. This because the preparation for the generating of braking torque is done before the torque provided by the internal combustion engine is reduced.

According to an aspect of the invention the method comprises the further steps of:

h) receiving a second signal indicating if the gear ratio should be changed, and i) returning the at least one second camshaft to the phase it was before the phase-shifting in step c) or to another phase if the second signal in step h) indicates the gear ratio should not be changed. If the driving conditions for some reason will be different from the predicted driving conditions the second camshaft is returned to the phase it was before the phase-shifting in step c), otherwise the gear ratio should be changed. However, the at least one second camshaft may be returned to another phase which leads to a faster increase of torque comparing to the situation when the at least one second camshaft is returned to the phase it was before the phase-shifting. Thus, when the gear has been shifted in the gearbox, the torque provided by the internal combustion engine may be increased faster when supplying and increasing fuel to at least one of the cylinders in the internal combustion engine and when the at least one second camshaft is returned to a another phase or a position that makes it possible to increase the torque faster.

According to an aspect of the invention the at least one second camshaft is phase-shifted between −60° and −120° crankshaft degrees. The numbers of degrees every second camshaft should be phase-shifted is dependent on the driving conditions of the vehicle and is a result of the calculation of the braking torque in step b).

According to an aspect of the invention the exhaust valves in step e) are opened with the decompression device 40°-80° crankshaft degrees before the top dead centre between the exhaust stroke and the inlet stroke, and also between the compression stroke and the expansion stroke, and that the at least one exhaust valve is closed with the decompression device 40°-80° after the top dead centre between the exhaust stroke and the inlet stroke and also between the compression stroke and the expansion stroke. When opening and closing the exhaust valves as above, the engine braking will generate a high braking effect in order to reduce the rotational speed of the internal combustion engine in a short period of time, so that a quick and efficient gear shifting can be achieved.

According to an aspect of the invention every second camshaft in step c) is phase-shifted with a phase-shifting device arranged for every second camshaft. Such a phase-shifting device arranged for every second camshaft will effectively control the size of the braking torque that the internal combustion engine should provide.

According to an aspect of the invention the torque provided by the internal combustion engine in step g) is reduced by closing or reducing the fuel supply to at least one of the cylinders. The torque provided by the internal combustion engine is quick and effectively reduced by closing or reducing the fuel supply to at least one of the cylinders.

According to an aspect of the invention the method, after step e) and before step f), further comprises the step:

j) deactivate the decompression device when the internal combustion engine has reached the target rotational speed which is calculated in step b). When the decompression device is deactivated no braking torque is exerted by the cylinders of internal combustion engine, and as a result the rotational speed of the internal combustion engine will not decrease further.

According to an aspect of the invention the method after step j) further comprises the step:

k) increasing the torque provided by the internal combustion engine and returning the at least one second camshaft to the phase it was before the phase-shifting in step c) or to another phase. When the gear ratio has been changed the torque provided by the internal combustion engine is increased and substantially simultaneously the at least one second camshaft is returned to the phase it was before the phase-shifting in step c). This will reduce the period of time for changing gear ratio in the gearbox. However, the at least one second camshaft may be returned to another phase which leads to a faster increase of torque comparing to the situation when the at least one second camshaft is returned to the phase it was before the phase-shifting. Thus, when the gear has been shifted in the gearbox, the torque provided by the internal combustion engine may be increased faster when supplying and increasing fuel to at least one of the cylinders in the internal combustion engine and when the at least one second camshaft is returned to a another phase or a position that makes it possible to increase the torque faster.

According to an aspect of the invention a look-ahead function is arranged to generate the first signal in step a). The look-ahead function comprising information of the geography in which the vehicle is moving. Having such information the driving conditions for the vehicle can be calculated for the road ahead of the vehicle. Therefore, the vehicle may be prepared for a coming change of gear ratio. Thus, at least the steps a)-c) may be executed at an early stage before changing of gears in the gearbox takes place. This will reduce the period of time for changing gear ratio in the gearbox.

Further objects, advantages and novel features of the present invention will become apparent to one skilled in the art from the following details, and also by putting the invention into practice. Whereas the invention is described below, it should be noted that it is not restricted to the specific details described. Specialists having access to the teachings herein will recognize further applications, modifications and incorporations within other fields, which are within the scope of the invention.

BRIEF DESCRIPTION OF THE DRAWINGS

Below is a description, as an example, of preferred embodiments of the invention with reference to the enclosed drawings, in which.

DETAILED DESCRIPTION OF THE INVENTION

Figure 1:
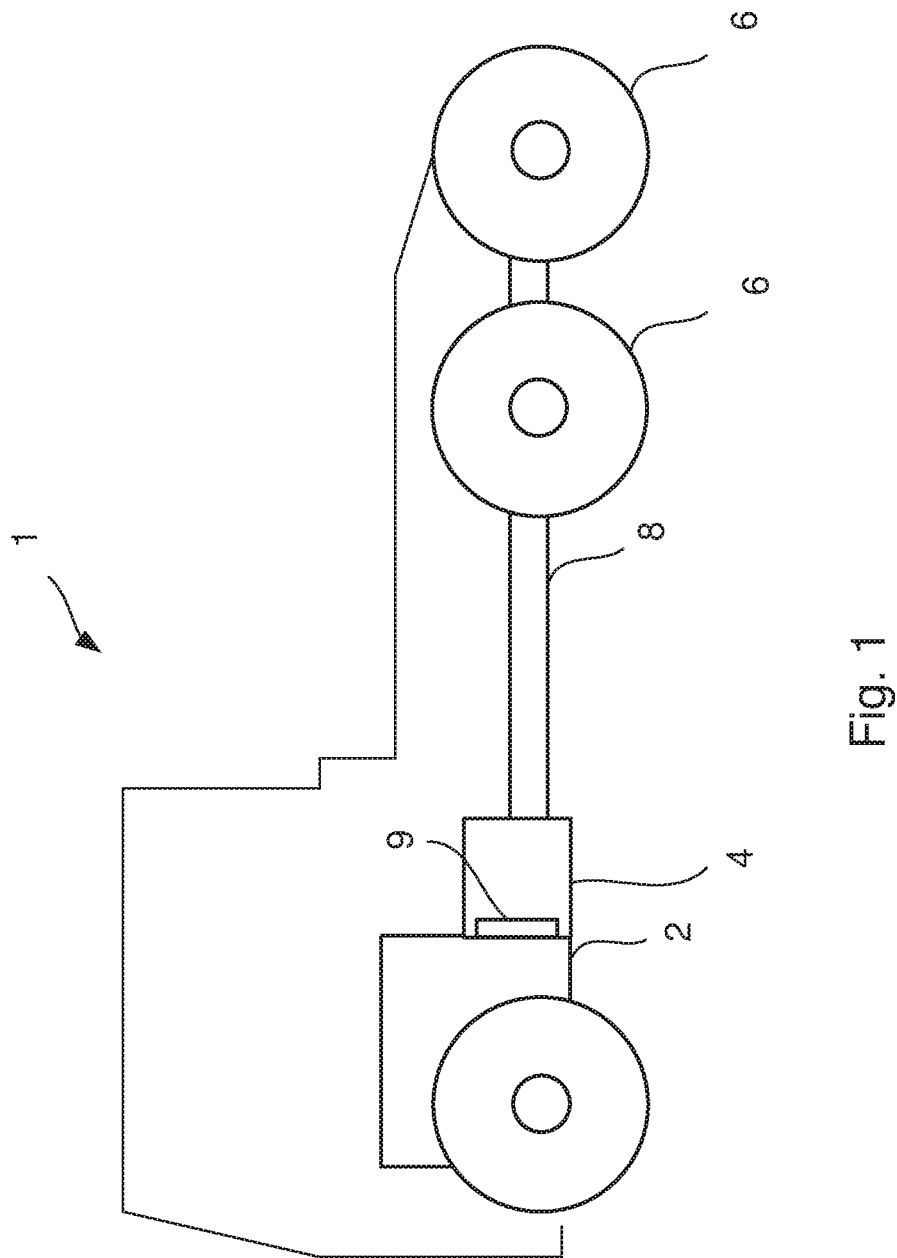
FIG. 1 is a side view of a schematically displayed vehicle according to the present invention.

FIG. 1 shows a schematic side view of a vehicle 1, which vehicle 1 is equipped with a four-stroke internal combustion engine 2, which is controlled by a method according to the present invention. The internal combustion engine 2 may be a diesel engine. The vehicle 1 is also equipped with a gearbox 4 connected to an internal combustion engine 2, driving the driving wheels 6 of the vehicle 1 via the gearbox 4, and a propeller shaft 8. A clutch 9 is arranged between the internal combustion engine 2 and the gearbox 4, so that the internal combustion engine 2 can be connected to and disconnected from the gearbox 4 and the driving wheels 6.

Figure 2:
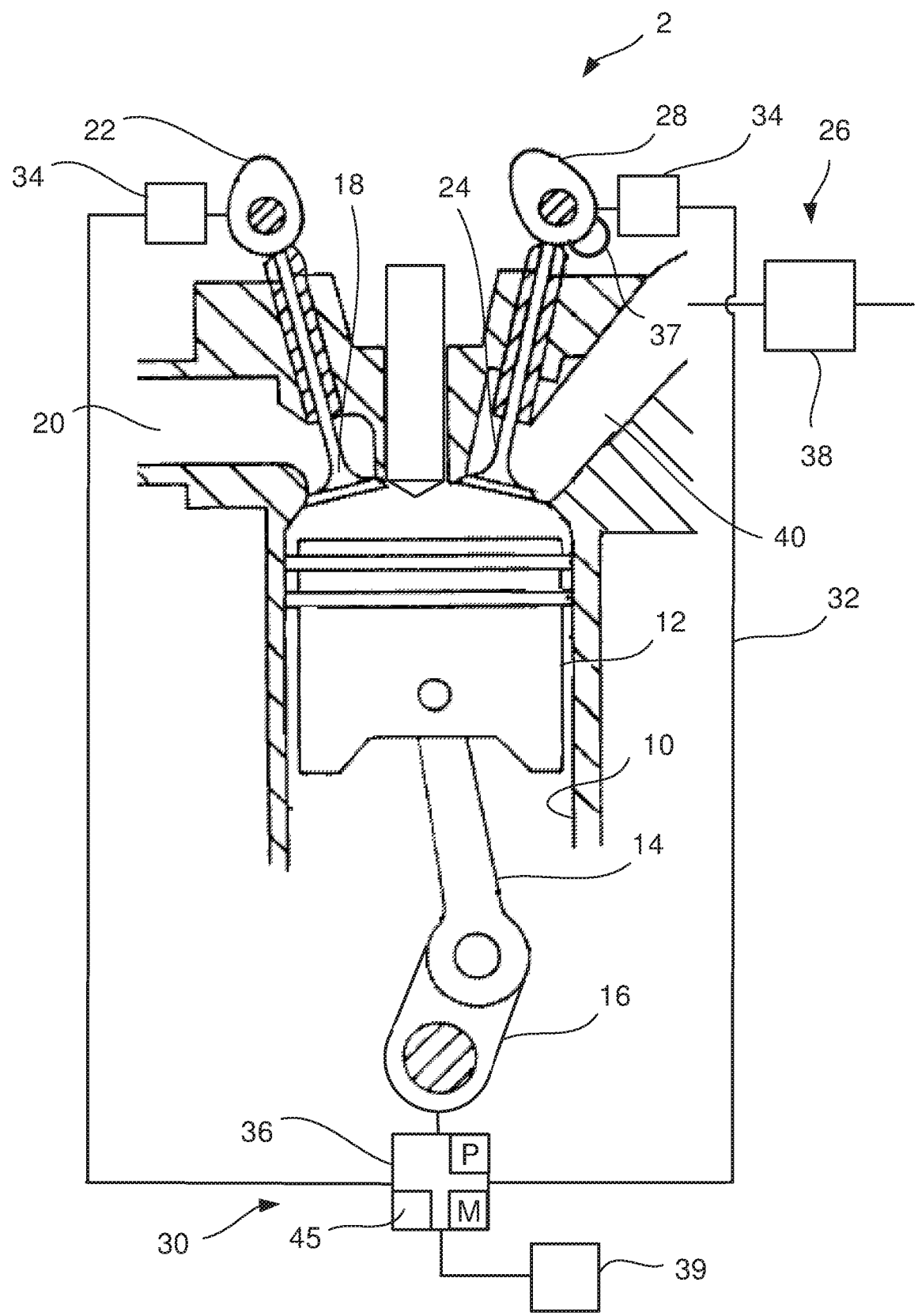
FIG. 2 is a cross-sectional view of a schematically displayed internal combustion engine controlled by a method according to the present invention.

FIG. 2 shows a cross-sectional view of an internal combustion engine 2 according to the present invention. The internal combustion engine 2 comprises at least one cylinder 10, with a piston 12 arranged in each cylinder 10. The piston 12 is connected via a connecting rod 14 to a crankshaft 16, which at rotation moves the piston 12 forwards and backwards in the cylinder 10. At least one inlet valve 18 is arranged in each cylinder 10, which inlet valve 18 is connected with an inlet system 20. At least one first camshaft 22 controls each inlet valve 18. At least one exhaust valve 24 is arranged in each cylinder 10, which exhaust valve 24 is connected with an exhaust system 26. Two inlet valves 18 and two exhaust valves 24 may be arranged in each cylinder 10. At least one second camshaft 28 controls at least one exhaust valve 24. Depending on the type of internal combustion engine 2, two first and two second camshafts 22, 28 may be arranged in the internal combustion engine 2. This is advantageous if the engine 2 is of V-type. The internal combustion engine may have several cylinders 10.

A camshaft control 30 is arranged in the internal combustion engine 2 according to the present invention. The crankshaft 16 controls each camshaft 22, 28 via a camshaft transmission 32. At least one phase-shifting device 34 is arranged between the crankshaft 16 and each camshaft 22, 28, so that each camshaft 22, 28 may be phase-shifted to a desired angular position in relation to the angular position of the crankshaft. A phase-shifting device 34 may be arranged for each camshaft 22, 28. An electronic control unit 36 receives signals from a number of different sensors (not shown), such as absolute pressure in the inlet manifold, charge air temperature, mass airflow, throttle position, engine speed, engine load. The electronic control unit 36 operates the phase-shifting devices 34, which adjust the angle position of the camshafts 22, 28 in relation to the crankshaft 16. A decompression device 37 is connected to the exhaust valves 24, decompression device 37 is adapted to open and close the exhaust valves 24 in the transition area between an exhaust stroke and an inlet stroke, when the piston 12 is at top dead centre in the cylinder 10. By opening the exhaust valves 24 in the transition area between an exhaust stroke and an inlet stroke, the pressure in the cylinders 10 is reduced when the inlet valves 18 are opened. The risk of engine failure is therefore reduced when engine braking is carried out by using compression during the exhaust stroke. The decompression device 37 is connected to the electronic control unit 36. The decompression device 37 is also adapted to open and close the exhaust valves 24 in the transition area between a compression stroke and an expansion stroke, when the piston 12 is at top dead centre in the cylinder 10. By opening the exhaust valves 24 by means of the decompression device in said transition areas the pressure in the cylinders 10 is reduced, so that engine braking torque is generated during the next coming compression stroke and the next coming exhaust stroke strokes.

The internal combustion engine 2, the clutch 9, and the gearbox 4 may be arranged in connection to the control unit 36. The control unit 18 is adapted to control the internal combustion engine 2, the clutch 9 and the gearbox 4. A computer 39 may be connected to the control unit 39. The control unit 39 and/or the computer 39 comprise a computer program P, which can include routines to control the internal combustion engine 2 the clutch 9 and the gearbox 4. A program P may be stored in an executable form or compressed form in a memory M and/or in a read/write memory M. A computer program product may be provided, which comprises a program code stored on a, by a computer readable medium for controlling the internal combustion engine 2, the clutch 9 and the gearbox 4 when said program is run on the control unit 36 or the computer 39 connected to the control unit 36. Said code may be non-volatile, stored in said computer readable medium.

Figure 3:
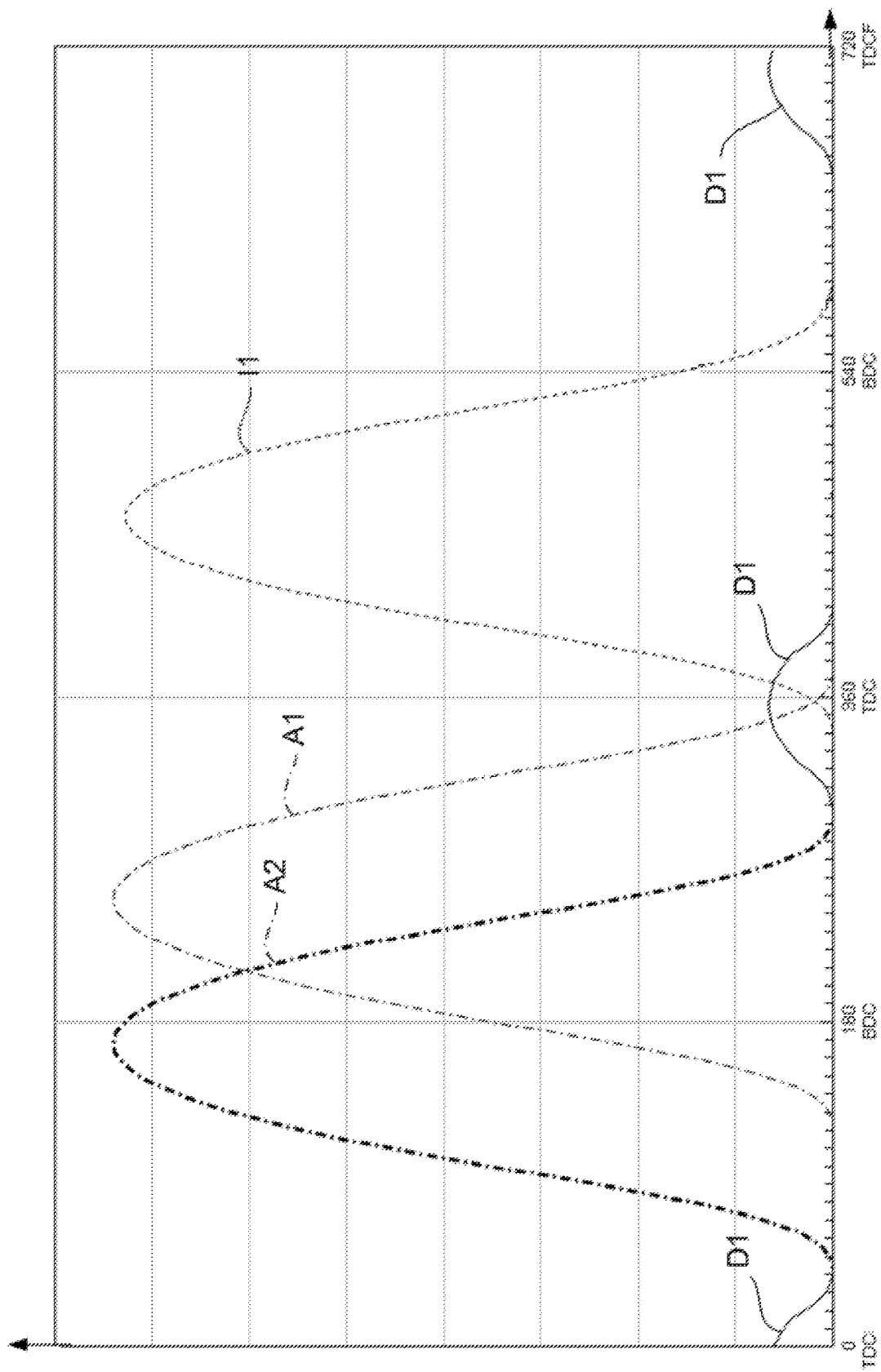
FIG. 3 shows a diagram of a phase shift of exhaust valves in an internal combustion engine according to the present invention.

FIG. 3 shows a graph representing a phase shift of exhaust valves 24 in an internal combustion engine 2 according to the present invention. The Y-axis represents the distance that the exhaust valves 24 move. The X-axis represents the angular movement of the crankshaft 16. The piston 12 moves between a top dead centre, TDC, and a bottom dead centre, BDC, in the cylinder 10. At e.g. 0°, the piston 12 is at the top dead centre, TDC, and at 180° the piston 12 is at the bottom dead centre, BDC. The graph in FIG. 3 represents an internal combustion engine 2 of four-stroke type, which entails that the crankshaft 16 and therefore the piston 12 will have moved 720° when all four strokes have been completed.

The curve A1 represents the movement of the exhaust valve 24 in relation to the piston movement at normal load. The curve I1 represents the movement of the inlet valve 18 in relation to the piston movement at normal load. FIG. 3 thus shows, through the curve A1, that the exhaust valve 24 at normal load opens at the end of the expansion stroke, i.e. at 120°, in order to release the exhausts to the exhaust and after-treatment system 38 during the exhaust stroke. The exhaust valve 24 then closes at the start of the inlet stroke, which occurs at 360°. Roughly at the same time, the inlet valve 18 opens, shown by the curve I1, in order to let air into the cylinder 10. The inlet valve 18 then closes at 590°, at which point the compression stroke is initiated. At 720°, corresponding to 0°, the expansion stroke is started.

The curve A2 illustrates a situation where the internal combustion engine 2, and therefore the vehicle 1, are decelerated through engine braking according to the present invention, wherein the phase-shifting device 34 for the second camshaft 28 has been adjusted, so that the exhaust valves 24 open and close earlier than what would be the case with normal load. At the same time, the fuel supply to one or several of the cylinders 10 of the internal combustion engine 2 is closed or restricted, so that no fuel, or a limited volume of fuel is injected into one or several of the cylinders 10. By phase-shifting the second camshaft 28 in relation to the crankshaft 16, so that every second camshaft 28 is phase-shifted to a state, where the exhaust valves 24 are controlled in such a way that they are opened during the expansion stroke of the internal combustion engine 2 and closed during the exhaust stroke of the internal combustion engine 2, engine braking is achieved through compression in the cylinders 10 during the exhaust stroke. The second camshaft 22 may be phase-shifted between −60° and −120° crankshaft degrees. Engine braking is thus obtained, since compression arises in the cylinders 10 during both the compression stroke and the exhaust stroke.

In order to utilize the braking energy at engine braking, the pressure of the air compressed in the cylinders 10 must be reduced at the end of each compression. The exhaust valves 24 are therefore opened and closed with the decompression device 37 in the transition area between an exhaust stroke and an inlet stroke, when the piston 12 is at a top dead centre in the cylinder 10. The air compressed in the cylinders 10 will therefore leave the cylinders 10 through the exhaust channels and further along through the exhaust system. The decompression device 37 subsequently closes the exhaust valves 24, so that air may be sucked in through the inlet valves 18, and an overpressure may be built up in the cylinders 10 at the next compression. With the decompression device the exhaust valves 24 may be opened 40°-80° crankshaft degrees, before the top dead centre between the exhaust stroke and the inlet stroke, and also between the compression stroke and the expansion stroke, and the exhaust valves 24 may be closed with the decompression device 40°-80°, after the top dead centre between the exhaust stroke and the inlet stroke and also between the compression stroke and the expansion stroke. The opening and closing of the exhaust valves 24 with the decompression device 37 is shown by the curves D1 in FIG. 3.

Figure 4A:
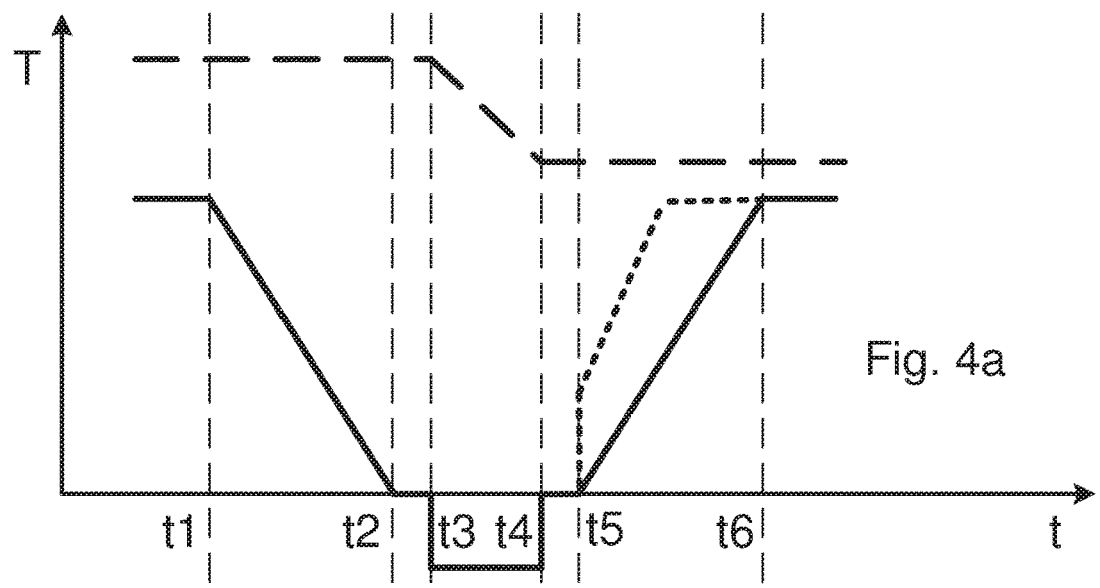
FIG. 4*a* illustrates a diagram of torque variations during a method for changing gear ratio in the gearbox of the vehicle according to the invention.
Figure 4B:
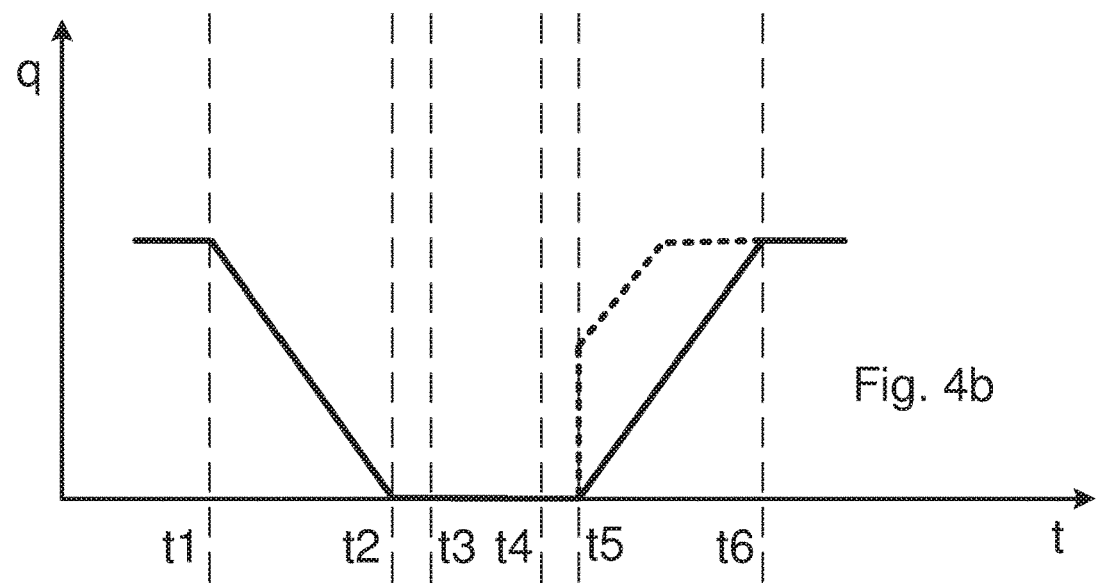
FIG. 4*b* illustrates a diagram of variations of fuel delivered to the internal combustion engine during a method for changing gear ratio in the gearbox of the vehicle according to the invention.
Figure 4C:
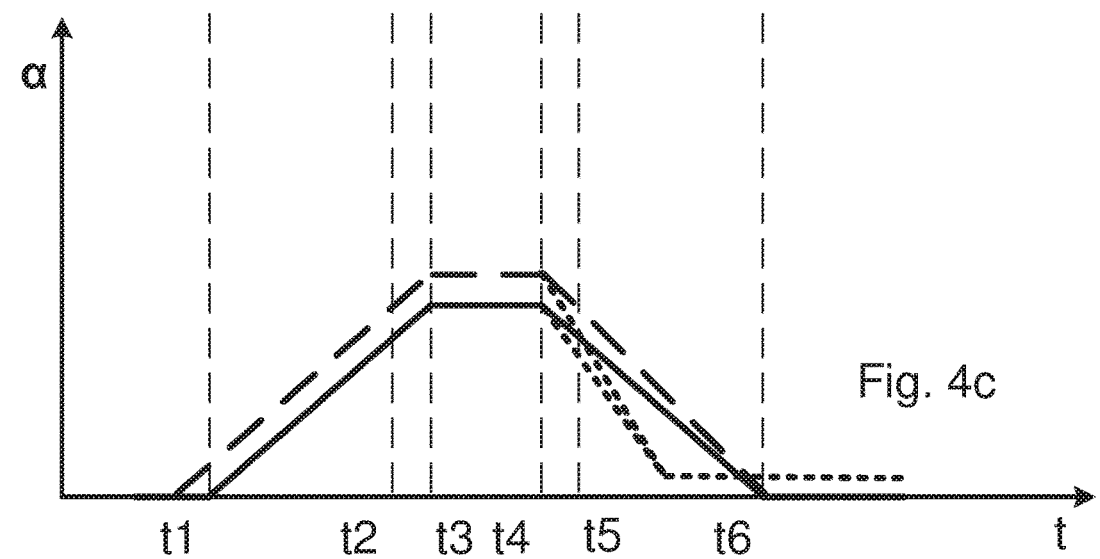
FIG. 4*c* illustrates a diagram of phase-shifting of the exhaust valves during a method for changing gear ratio in the gearbox of the vehicle according to the invention.

FIGS. 4a, 4b and 4c illustrates diagrams of torque T, diesel fuel q delivered to the internal combustion engine 2 and the phase-shifting α of the exhaust valves 24 during a method for changing gear ratio in the gearbox 4 of the vehicle 1 according to an embodiment of the invention. In FIG. 4a the torque generated by the internal combustion engine is illustrated by the unbroken line. The broken line illustrates variations of rotational speed of the internal combustion engine. At time t1 a first signal S1 is generated indicating that the gear ratio should be changed. A braking torque of the internal combustion engine 2 is then calculated which correspond to a braking torque that the internal combustion engine 2 should provide in order to reduce the rotational speed of the internal combustion engine 2 to a target rotational speed at which the internal combustion engine 2 should be running after the gear ratio has been changed. According to a first embodiment of the invention the torque provided by the internal combustion engine 2 is reduced at t1 substantially simultaneously as the at least one second camshaft 28 is phase-shifted in relation to the crankshaft 16. The phase-shifting according to this first embodiment is illustrated by the unbroken line in FIG. 4c.

According to a second embodiment the at least one second camshaft 28 is phase-shifted before t1. The phase-shifting according to the second embodiment is illustrated by the broken line in FIG. 4c. An advantage to phase-shift the at least one second camshaft 28 before t1 is that the at least one second camshaft 28 is prepared for a decompression step before the torque provided by the internal combustion engine 2 is reduced.

The torque provided by the internal combustion engine 2 is reduced at t1 in FIG. 4b by closing or reducing the fuel supply to at least one of the cylinders 10 in the internal combustion engine 2.

At t2 the torque generated by the internal combustion engine 2 and the fuel supply to at least one of the cylinders 10 in the internal combustion engine 2 has been reduced to zero. At this point of time the internal combustion engine 2 is disconnected from the driving wheels 6 by means of disengaging the clutch 9 and/or changing the gearbox 4 to a neutral gear.

At t3, illustrated in FIG. 4c, the at least one second camshaft 28 is phase-shifted in relation to the crankshaft 16, so that the internal combustion engine 2 is exerting the braking torque in order to reduce the rotational speed of the internal combustion engine 2 to the target speed, which is illustrated at t3 in FIG. 4a.

The internal combustion engine 2 has reached the rotational target speed at t4, and thus a gear shifting is possible in the gearbox 4 due to synchronizing possibilities. At the same time the at least one second camshaft 28 is returned to the phase it was before the phase-shifting.

At t5 the gear has been shifted in the gearbox and the torque provided by the internal combustion engine 2 is increased by supplying and increasing fuel to at least one of the cylinders 10 in the internal combustion engine 2.

At t6 the internal combustion engine 2 provides torque to the driving wheels 6 and is rotating at the target speed. The at least one second camshaft 28 has been returned to the phase it was before the phase-shifting.

In the above-mentioned embodiments a specific gear shift performance may be selected by the driver. The gear shift performance may be dependent on the road gradient, vehicle weight, driving mode, such as eco-mode or off-road mode. The specific gear shift performance may be selected before time t1 in the above-mentioned embodiments. The specific gear shift performance may also be selected after time t6. The period of time for shifting gears and thus the driving comfort experienced by the driver and passengers in the vehicle 1 may vary depending on the selected gear shift performance.

Instead of returning the at least one second camshaft 28 to the phase it was before the phase-shifting, the at least one second camshaft 28 may in the above-mentioned embodiments be returned to another phase in relation to the phase it was before the phase-shifting. The at least one second camshaft 28 may be returned to a phase which leads to a faster increase of torque T comparing to the situation when the at least one second camshaft 28 is returned to the phase it was before the phase-shifting. Thus, when the gear has been shifted in the gearbox at t5, the torque T provided by the internal combustion engine 2 may be increased faster when supplying and increasing fuel to at least one of the cylinders 10 in the internal combustion engine 2 and when the at least one second camshaft 28 is returned to a phase or a position that makes it possible to increase the torque T faster. In FIGS. 4a-4c the torque T, the fuel q delivered to the internal combustion engine 2 and the phase-shifting α of the exhaust valves 24 in relation to time t are indicated with dotted lines when the at least one second camshaft 28 is returned to another phase in relation to the phase it was before the phase-shifting. The torque T increases faster than the situation when the at least one second camshaft 28 is returned to the phase it was before the phase-shifting.

Figure 5:
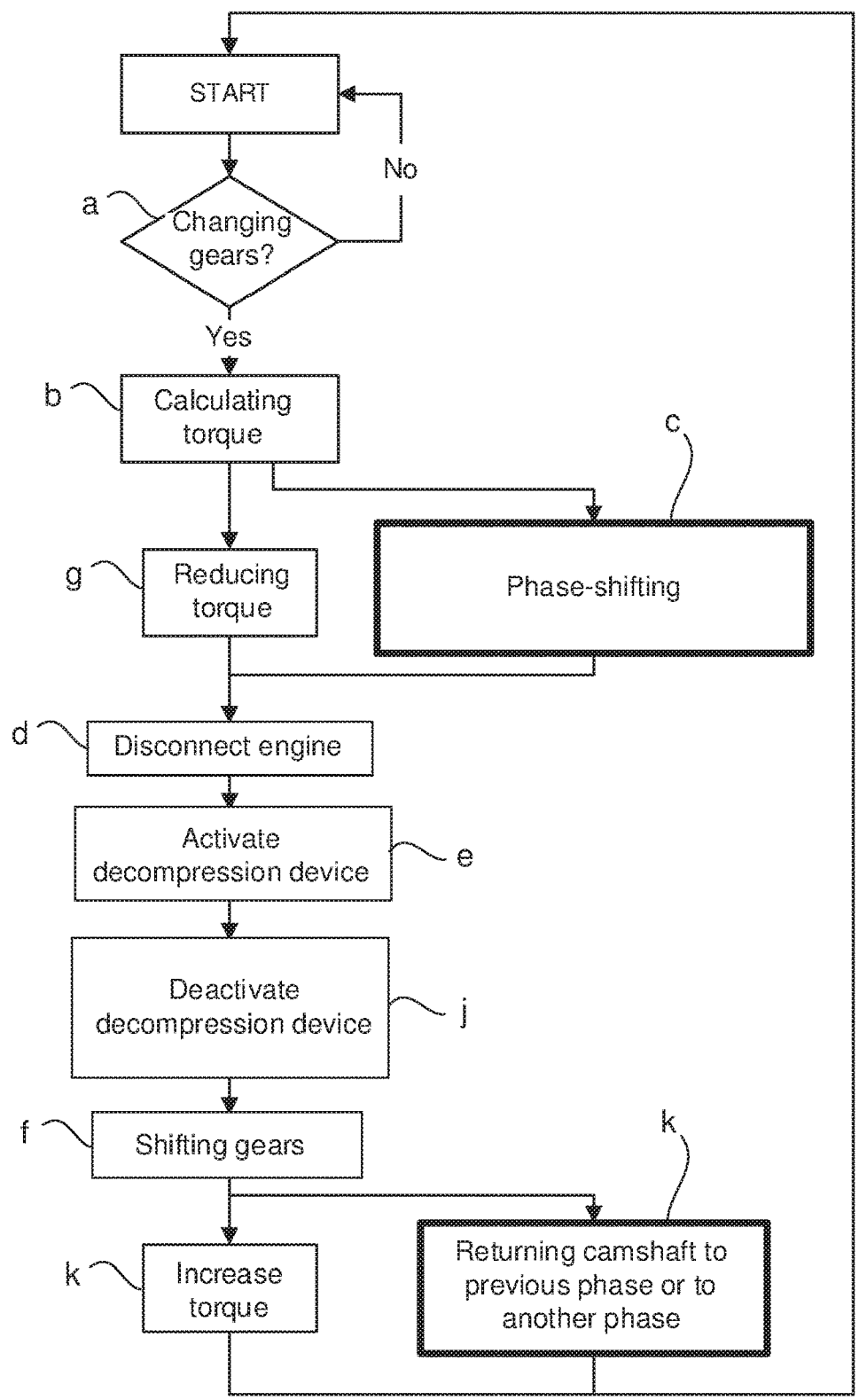
FIG. 5 shows a flow chart of a method according to a first embodiment of the invention.
Figure 6:
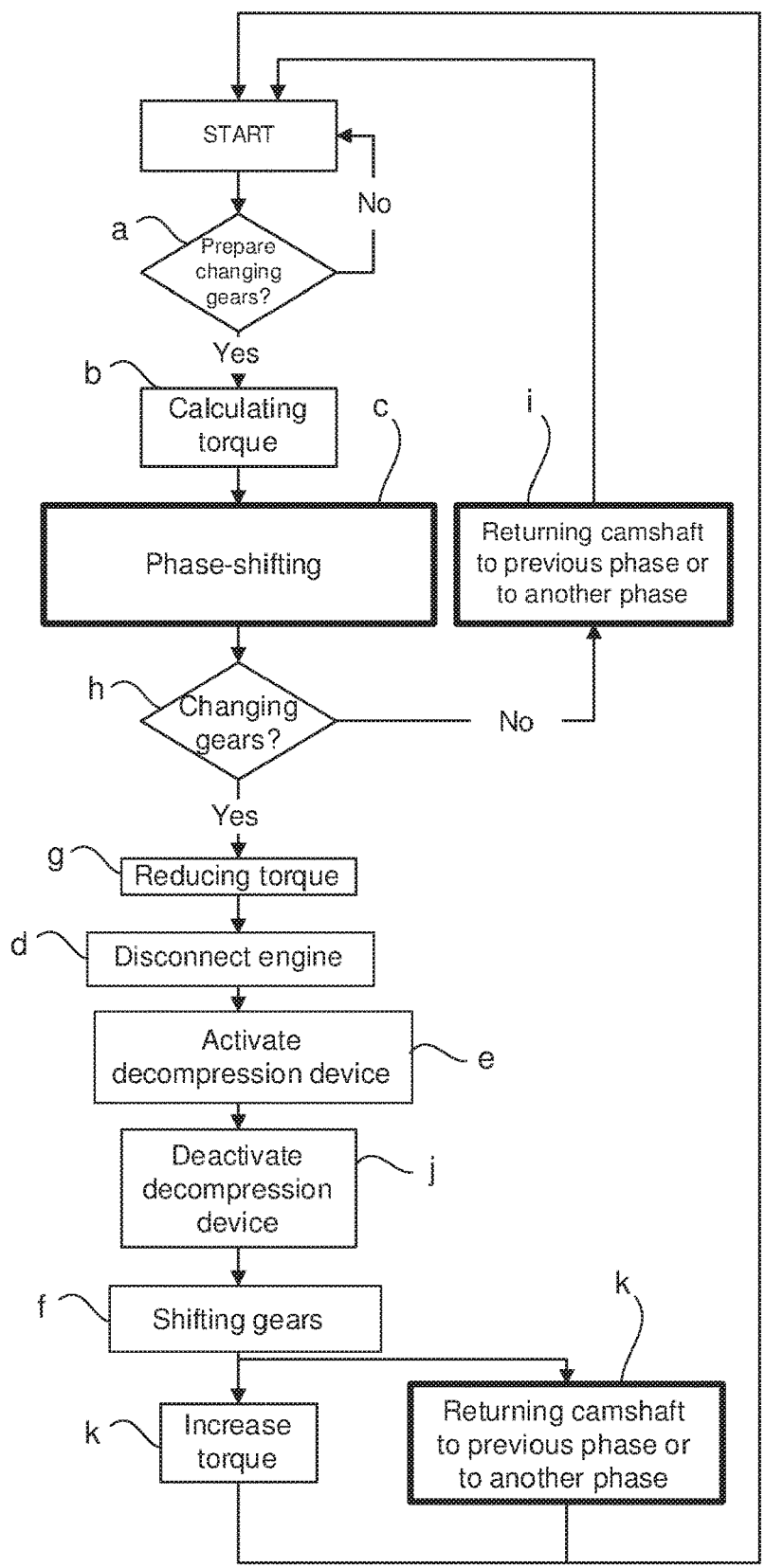
FIG. 6 shows a flow chart of a method according to a second embodiment of the invention.

The method for changing gear ratio in a gearbox 4 of a vehicle 1 according to the present invention will be described below jointly with the flow charts in FIGS. 5 and 6, which method comprises the steps:

a) receiving a first signal S1 that the gear ratio should be changed;

b) calculating the braking torque that the internal combustion engine 2 should provide in order to reduce the rotational speed of the internal combustion engine 2 to a target rotational speed at which the internal combustion engine 2 should be running after the gear ratio has been changed;

c) phase-shifting the at least one second camshaft 28 in relation to the crankshaft 16, so that the at least one second camshaft 28 is phase-shifted to a state, where the at least one exhaust valve 24 is controlled in such a way, that it is opened during the expansion stroke of the internal combustion engine 2 and closed during the exhaust stroke of the internal combustion engine 2, wherein the phase shifting of every second camshaft 28 may be controlled, in order to control the compression during the exhaust stroke, for achieving stepless control of the size of the braking torque during engine braking, so that the size of the braking torque that the internal combustion engine 2 should provide and is calculated in step b) is dependent on how many degrees every second camshaft 28 is phase-shifted;

d) disconnecting the internal combustion engine 2 from the at least one driving wheel 6;

e) opening and closing the at least one exhaust valve 24 with a decompression device in the transition area between an exhaust stroke and an inlet stroke, and also between a compression stroke and an expansion stroke, when the piston 12 is at a top dead centre in the cylinder 10 in order to achieve engine braking through compression in the cylinders 10 during the exhaust stroke and the compression stroke, and f) shifting gear in the gearbox 4.

In step a) the first signal S1 is received, which indicates that the gear ratio should be changed. The gear shifting in the gearbox 4 may be an upshift, which means that the rotational speed of the internal combustion engine 2 should be lower after the gear shifting comparing to the rotational speed before the gear shifting. In order to shorten time for reducing the rotational speed of the internal combustion engine 2, the braking torque that the internal combustion engine 2 should provide is calculated in step b) in order to reduce the rotational speed of the internal combustion engine 2 to the target rotational speed at which the internal combustion engine 2 should be running after the gear ratio has been changed.

In order to achieve a quick and efficient gear shifting, the generation of braking torque is prepared by means of phase-shifting the at least one second camshaft 28 in relation to the crankshaft 16 in step c), so that the at least one second camshaft 28 is phase-shifted to a state, where the at least one exhaust valve 24 is controlled in such a way, that it is opened during the expansion stroke of the internal combustion engine 2 and closed during the exhaust stroke of the internal combustion engine 2. The phase-shifting of the at least one second camshaft 28 will at this stage not lead to the generating of braking torque, but is only a preparation for the generating of braking torque. The stepless control of the size of the braking torque during engine braking is achieved by the calculation in step b). Thus, the braking torque is dependent on how many degrees every second camshaft 28 is phase-shifted. Such a phase-shifting device arranged for every second camshaft 28 will effectively control the size of the braking torque that the internal combustion engine 2 should provide. Thus, the phase-shifting of every second camshaft 28 will make it possible to control the braking torque.

When disconnecting the internal combustion engine from the at least one driving wheel 6 in step d) the internal combustion engine 2 in rotating independently from the at least one driving wheel 6. Thus, the rotational speed of the internal combustion engine 2 may be changed. The disconnecting of the internal combustion engine 2 from the at least one driving wheel 6 may be performed by means of disengaging the clutch between the internal combustion engine 2 and the gearbox 4 and/or shifting the gearbox 4 to a neutral gear.

Engine braking is achieved by opening and closing the at least one exhaust valve 24 in step e) by means of a decompression device 37 in the transition area between an exhaust stroke and an inlet stroke, and also between a compression stroke and an expansion stroke, when the piston 12 is at a top dead centre in the cylinder 10. The engine braking is achieved through compression in the cylinders 10 during the exhaust stroke and the compression stroke. The engine braking will generate a high braking effect in order to reduce the rotational speed of the internal combustion engine 2 in a short period of time, so that a quick and efficient gear shifting can be achieved.

When the rotational speed of the internal combustion engine 2 has been reduced to a target rotational speed at which the internal combustion engine 2 should be running after the gear ratio has been changed, shifting gear in the gearbox 4 is performed according to step f).

According to an embodiment of the invention step c) is performed substantially simultaneously as a further step g): reducing the torque provided by the internal combustion engine 2.

Reducing the torque provided by the internal combustion engine 2 is made by closing or reducing the fuel supply to the cylinders 10 of the internal combustion engine 2. When steps c) and g) are performed substantially simultaneously the period of time for changing gear ratio in a gearbox 4 is reduced.

According to an embodiment of the invention, after step c) and before step d), the method comprises a further step g): reducing the torque provided by the internal combustion engine 2.

Reducing the torque provided by the internal combustion engine 2 is made by closing or reducing the fuel supply to the cylinders 10 of the internal combustion engine 2. When torque is reduced after the phase-shifting of the at least one second camshaft 28 in step c) the period of time for changing gear ratio in a gearbox 4 is even more reduced. The reason for this is that the preparation for the generating of braking torque is done before the torque provided by the internal combustion engine 2 is reduced.

According to an embodiment of the invention the method comprises the further steps of:

h) receiving a second signal S2 indicating if the gear ratio should be changed, and i) returning the at least one second camshaft 28 to the phase it was before the phase-shifting in step c) or to another phase if the signal S2 in step h) indicates the gear ratio should not be changed.

If the driving conditions for some reason will be different from the predicted driving conditions the second camshaft 28 is returned to the phase it was before the phase-shifting in step c), otherwise the gear ratio should be changed. However, the at least one second camshaft 28 may be returned to another phase which leads to a faster increase of torque T comparing to the situation when the at least one second camshaft 28 is returned to the phase it was before the phase-shifting. Thus, when the gear has been shifted in the gearbox, the torque T provided by the internal combustion engine 2 may be increased faster when supplying and increasing fuel to at least one of the cylinders 10 in the internal combustion engine 2 and when the at least one second camshaft 28 is returned to a another phase or a position that makes it possible to increase the torque T faster.

According to an embodiment of the invention the at least one second camshaft 28 is phase-shifted between −60° and −120° crankshaft degrees.

The numbers of degrees every second camshaft 28 should be phase-shifted is dependent on the driving conditions of the vehicle 1 and is a result of the calculation of the braking torque in step b).

According to an embodiment of the invention the exhaust valves 24 in step e) are opened with the decompression device 40°-80° crankshaft degrees before the top dead centre between the exhaust stroke and the inlet stroke, and that the at least one exhaust valve 24 is closed with the decompression device 40°-80° after the top dead centre between the exhaust stroke and the inlet stroke.

According to an aspect of the invention the exhaust valves 24 in step e) are opened with the decompression device 40°-80° crankshaft degrees before the top dead centre between the exhaust stroke and the inlet stroke, and also between the compression stroke and the expansion stroke, and that the at least one exhaust valve 24 is closed with the decompression device 40°-80° after the top dead centre between the exhaust stroke and the inlet stroke and also between the compression stroke and the expansion stroke.

When opening and closing the exhaust valves 24 as above, the engine braking will generate a high braking effect in order to reduce the rotational speed of the internal combustion engine 2 in a short period of time, so that a quick and efficient gear shifting can be achieved.

According to an embodiment of the invention every second camshaft 28 in step c) is phase-shifted with a phase-shifting device 34 arranged for every second camshaft 28.

Such a phase-shifting device arranged for every second camshaft 28 will effectively control the size of the braking torque that the internal combustion engine 2 should provide.

According to an embodiment of the invention the torque provided by the internal combustion engine 2 in step g) is reduced by closing or reducing the fuel supply to at least one of the cylinders 10.

The torque provided by the internal combustion engine 2 is quick and effectively reduced by closing or reducing the fuel supply to at least one of the cylinders 10.

According to an embodiment of the invention the method, after step e) and before step f), further comprises the step:

j) deactivate the decompression device when the internal combustion engine 2 has reached the target rotational speed which is calculated in step b). When the decompression device 37 is deactivated no braking torque is exerted by the cylinders 10 of internal combustion engine 2, and as a result the rotational speed of the internal combustion engine 2 will not decrease further.

According to an embodiment of the invention the method after step j) further comprises the step:

k) increasing the torque provided by the internal combustion engine 2 and returning the at least one second camshaft 28 to the phase it was before the phase-shifting in step c) or to another phase.

When the gear ratio has been changed the torque provided by the internal combustion engine 2 is increased and substantially simultaneously the at least one second camshaft 28 is returned to the phase it was before the phase-shifting in step c). This will reduce the period of time for changing gear ratio in the gearbox 4. However, the at least one second camshaft 28 may be returned to another phase which leads to a faster increase of torque T comparing to the situation when the at least one second camshaft 28 is returned to the phase it was before the phase-shifting. Thus, when the gear has been shifted in the gearbox, the torque T provided by the internal combustion engine 2 may be increased faster when supplying and increasing fuel to at least one of the cylinders 10 in the internal combustion engine 2 and when the at least one second camshaft 28 is returned to a another phase or a position that makes it possible to increase the torque T faster.

According to an embodiment of the invention a look-ahead function 45 is arranged to generate the first signal S1 in step a).

The look-ahead function 45 comprising information of the geography in which the vehicle 1 is moving. Having such information the driving conditions for the vehicle 1 can be calculated for the road ahead of the vehicle 1. Therefore, the vehicle 1 may be prepared for an upcoming change of gear ratio. Thus, at least the steps a)-c) may be executed at an early stage before changing of gears in the gearbox 4 takes place. This will reduce the period of time for changing gear ratio in the gearbox 4. The look-ahead function 45 may be arranged in the electronic control unit 36.

The components and features specified above may, within the framework of the invention, be combined between different embodiments specified.

The invention claimed is:

1. A method for changing a gear ratio in a gearbox of a vehicle, said gearbox being arranged to transfer torque between a four stroke internal combustion engine and at least one driving wheel, said four stroke internal combustion engine comprising: one or more cylinders; a piston arranged in each cylinder of the one or more cylinders; one or more inlet valves arranged in each cylinder of the one or more cylinders, which each inlet valve of the one or more inlet valves is connected with an inlet system; at least one first camshaft which controls each inlet valve of the one or more inlet valves; one or more exhaust valves arranged in each cylinder of the one or more cylinders, which exhaust valve of the one or more exhaust valves is connected with an exhaust system; at least one second camshaft which controls each exhaust valve of the one or more exhaust valves; and a crankshaft which controls each of the first and second camshafts, said method comprising:
   a) receiving a first signal that the gear ratio should be changed;
   b) calculating a braking torque that the four stroke internal combustion engine should provide in order to reduce a rotational speed of the four stroke internal combustion engine to a target rotational speed at which the four stroke internal combustion engine should be running after the gear ratio has been changed;
   c) phase-shifting the at least one second camshaft in relation to the crankshaft, so that the at least one second camshaft is phase-shifted to a state, where the at least one exhaust valve of the one or more exhaust valves is controlled in such a way, that it is opened during an expansion stroke of the four stroke internal combustion engine and closed during an exhaust stroke of the four stroke internal combustion engine, wherein the phase shifting of the at least one second camshaft is controlled, in order to control compression during the exhaust stroke, for achieving stepless control of an amount of braking torque during engine braking, so that the amount of braking torque that the four stroke internal combustion engine provides is dependent on how many degrees the at least one second camshaft is phase-shifted;
   d) disconnecting the four stroke internal combustion engine from the at least one driving wheel;
   e) opening and closing the at least one exhaust valve of the one or more exhaust valves with a decompression device in a transition area between an exhaust stroke and an inlet stroke and also between a compression stroke and an expansion stroke, when the piston is at a top dead center in the at least one cylinder of the one or more cylinders in order to achieve engine braking through compression in the at least one cylinder of the one or more cylinders during the exhaust stroke and a compression stroke; and
   f) shifting a gear in the gearbox.

2. The method according to claim 1, wherein step c) is performed substantially simultaneously as a further step g) reducing a torque provided by the four stroke internal combustion engine.

3. The method according to claim 1, wherein after step c) and before step d), the method comprises a further step g) reducing a torque provided by the four stroke internal combustion engine.

4. The method according to claim 3, wherein the method further comprises:
   h) receiving a second signal indicating if the gear ratio should be changed; and
   i) returning the at least one second camshaft to a phase it was before the phase-shifting in step c) or to another phase if the second signal in step h) indicates the gear ratio should not be changed.

5. The method according to claim 1, wherein the at least one second camshaft is phase-shifted between −60° and −120° crankshaft degrees.

6. The method according to claim 1, wherein the at least one exhaust valve of the one or more exhaust valves in step e) are opened with the decompression device 40°-80° crankshaft degrees before the top dead center between the exhaust stroke and the inlet stroke, and also between the compression stroke and the expansion stroke, and that the at least one exhaust valve of the one or more exhaust valves is closed with the decompression device 40°-80° after the top dead center between the exhaust stroke and the inlet stroke and also between the compression stroke and the expansion stroke.

7. The method according to claim 1, wherein the at least one second camshaft in step c) is phase-shifted with a phase-shifting device.

8. The method according to claim 1, wherein the torque provided by the four stroke internal combustion engine is reduced by closing or reducing the fuel supply to the at least one cylinder of the one or more cylinders.

9. The method according to claim 1, wherein the method, after step e) and before step f), further comprises the step:
   j) deactivate the decompression device when the four stroke internal combustion engine has reached the target rotational speed.

10. The method according to claim 1, wherein the method after step j) further comprises the step:
    k) increasing the torque provided by the four stroke internal combustion engine and returning the at least one second camshaft to a phase it was before the phase-shifting in step c) or to another phase.

11. The method according to claim 1, wherein a look-ahead function is arranged to generate the first signal in step a).

12. A method for changing a gear ratio in a gearbox of a vehicle, where the vehicle comprises a gearbox being arranged to transfer torque between a four stroke internal combustion engine and at least one driving wheel, said four stroke internal combustion engine comprising: one or more cylinders; a piston arranged in each cylinder of the one or more cylinders; one or more inlet valves arranged in each cylinder of the one or more cylinders, which each inlet valve of the one or more inlet valves is connected with an inlet system; at least one first camshaft which controls each inlet valve of the one or more inlet valves; one or more exhaust valves arranged in each cylinder of the one or more cylinders, which exhaust valve of the one or more exhaust valves is connected with an exhaust system; at least one second camshaft which controls each exhaust valve of the one or more exhaust valves; and a crankshaft which controls each at least one first and at least one second camshafts, in which a gear ratio is changed, the method comprising:
   a) receiving a first signal that the gear ratio should be changed;
   b) calculating a braking torque that the four stroke internal combustion engine should provide in order to reduce a rotational speed of the four stroke internal combustion engine to a target rotational speed at which the four stroke internal combustion engine should be running after the gear ratio has been changed;
   c) phase-shifting the at least one second camshaft in relation to the crankshaft, so that the at least one second camshaft is phase-shifted to a state, where the at least one exhaust valve of the one or more exhaust valves is controlled in such a way, that it is opened during an expansion stroke of the four stroke internal combustion engine and closed during an exhaust stroke of the four stroke internal combustion engine, wherein the phase shifting of at least one second camshaft is controlled, in order to control compression during the exhaust stroke, for achieving stepless control an amount of braking torque during engine braking, so that the amount of braking torque that the four stroke internal combustion engine provides is dependent on how many degrees the at least one second camshaft is phase-shifted;
   d) disconnecting the four stroke internal combustion engine from the at least one driving wheel;
   e) opening and closing the at least one exhaust valve of the one or more exhaust valves with a decompression device in a transition area between an exhaust stroke and an inlet stroke and also between a compression stroke and an expansion stroke, when the piston is at a top dead center in the at least one cylinder of the one or more cylinders in order to achieve engine braking through compression in the at least one cylinder of the one or more cylinders during the exhaust stroke and a compression stroke; and
   f) shifting a gear in the gearbox.

13. The method according to claim 12, wherein step c) of the method is performed substantially simultaneously as a further step g) reducing a torque provided by the four stroke internal combustion engine.

14. The method according to claim 12, wherein after step c) and before step d), the method comprises a further step g) reducing a torque provided by the four stroke internal combustion engine.

15. The method according to claim 14, wherein the method further comprises:
   h) receiving a second signal indicating if the gear ratio should be changed; and
   i) returning the at least one second camshaft to a phase it was before the phase-shifting in step c) or to another phase if the second signal in step h) indicates the gear ratio should not be changed.

16. The vehicle according to claim 12, wherein the at least one second camshaft is phase-shifted between −60° and −120° crankshaft degrees.

17. A computer program product stored on a non-transitory computer-readable medium, said computer program product for changing gear ratio in a gearbox of a vehicle, said gearbox being arranged to transfer torque between a four stroke internal combustion engine and at least one driving wheel, said four stroke internal combustion engine comprising: one or more cylinders; a piston arranged in each cylinder of the one or more cylinders; one or more inlet valves arranged in each cylinder of the one or more cylinders, which each inlet valve of the one or more inlet valves is connected with an inlet system; at least one first camshaft which controls each inlet valve of the one or more inlet valves; one or more exhaust valves arranged in each cylinder of the one or more cylinders, which exhaust valve of the one or more exhaust valves is connected with an exhaust system; at least one second camshaft which controls each exhaust valve of the one or more exhaust valves; and a crankshaft which controls each camshaft, said computer program product comprising computer instructions to cause one or more electronic control units or computers to perform the following operations:

a) receive a first signal that the gear ratio should be changed;

b) calculate a braking torque that the four stroke internal combustion engine should provide in order to reduce a rotational speed of the four stroke internal combustion engine to a target rotational speed at which the four stroke internal combustion engine should be running after the gear ratio has been changed;

c) phase-shift the at least one second camshaft in relation to the crankshaft, so that the at least one second camshaft is phase-shifted to a state, where the at least one exhaust valve of the one or more exhaust valves is controlled in such a way, that it is opened during an expansion stroke of the four stroke internal combustion engine and closed during an exhaust stroke of the four stroke internal combustion engine, wherein the phase shifting of the at least one second camshaft is controlled, in order to control compression during the exhaust stroke, for achieving stepless control an amount of braking torque during engine braking, so that the amount of braking torque that the four stroke internal combustion engine provides is dependent on how many degrees the at least one second camshaft is phase-shifted;

d) disconnect the four stroke internal combustion engine from the at least one driving wheel;

e) open and close the at least one exhaust valve of the one or more exhaust valves with a decompression device in a transition area between an exhaust stroke and an inlet stroke and also between a compression stroke and an expansion stroke, when the piston is at a top dead center in the at least one cylinder of the one or more cylinders in order to achieve engine braking through compression in the at least one cylinder of the one or more cylinders during the exhaust stroke and a compression stroke; and f) shift a gear in the gearbox.

18. The computer program product according to claim 17, wherein operation c) is performed substantially simultaneously as a further computer instruction to cause one or more electronic control units or computers to g) reduce the torque provided by the four stroke internal combustion engine.

19. The computer program product according to claim 17, wherein after operation c) and before operation d) the computer program product further comprises computer instructions to cause one or more electronic control units or computers to g) reduce the torque provided by the four stroke internal combustion engine.

20. The computer program product according to claim 19, wherein the computer program product further comprises computer instructions to cause one or more electronic control units or computers to:

h) receive a second signal indicating if the gear ratio should be changed; and i) return the at least one second camshaft to a phase it was before the phase-shifting in operation c) or to another phase if the second signal in operation h) indicates the gear ratio should not be changed.

* * * * *